Patented Apr. 23, 1940

2,197,855

UNITED STATES PATENT OFFICE 2,197,855

RESIN AND METHOD OF MAKING SAME

Carleton Ellis, Montclair, N. J., assignor to Ellis-Foster Company, a corporation of New Jersey No Drawing. Application April 7, 1932,
Serial No. 603,898

15 Claims. (Cl. 260—22)

This invention relates to resins, balsams, and similar condensation and reaction products of the phthalic glyceride type, that is obtained by reaction of a polyhydric alcohol or equivalent material with an organic carboxylic acid, or mixtures of organic carboxylic acids.

The invention of this application is more particularly concerned with such resins and balsams and condensation products produced in the presence of inorganic acids, or compounds containing reacted inorganic acid radicals, particularly when such inorganic acids or equivalent materials enter into the resinous or similar complex obtained as a result of the reaction.

Other features of the present invention include novel complexes produced from natural acidic gums, whether or not produced in the presence of the inorganic acid ingredient or compound.

Other and further objects and advantages of the present invention will appear from the more detailed description set forth below, it being understood, however, that this more detailed description is given by way of illustration only, and not by way of limitation, since various changes may be made in this description by those skilled in the art without departing from the scope and spirit of the present invention.

This specification is a continuation in part of application, Serial No. 223,478, filed October 1, 1927, entitled "Resin and balsam prepared with the aid of an inorganic body and process of making same," now Patent No. 1,970,510, patented August 14, 1934. The claims of that patent are more particularly directed to the polyhydric alcohol-polybasic acid condensation products produced in the presence of an inorganic acid body containing replaceable hydrogen, and particularly when at least two organic carboxylic acids are employed in producing such product, and to methods of producing the same.

The production of these complexes containing the inorganic acid groups or substances present in the complex molecule, may be obtained in a variety of ways. The inorganic acid radicals or substances may be employed as part of the reaction mass including any of the well-known organic carboxylic acids and polyhydric alcohols or their derivatives and equivalents that have been employed for the production of these complexes, or the inorganic acid substance may enter into the complex by replacing, either in whole or in part, organic carboxylic acids.

In general it may be stated that the inorganic acid substance or inorganic acid radical, as the case may be, may be reacted into the complex in one of two ways, first during the formation of the complex, that is during the initial resinification reaction, and second, after the initial condensations have taken place. In either of these methods, the inorganic acids, or the compounds containing a reactive inorganic acid radical, may be utilized directly as such for reaction into the mass, or the acid may be first esterified, at least in part, by alcohols or phenols, for example, particularly polyhydric alcohols, prior to its incorporation. It should be kept in mind that the inorganic acid radical or compound not only enters into and modifies the complex per se, but it also materially affects and orients the reaction that would normally take place between the other ingredients present.

In addition to inorganic acid substances and compounds containing reactive inorganic acid radicals, there are other materials that may be considered as closely analogous thereto that may also be employed in an analogous manner, such as the chlorides of phosphorus, including the oxychloride of phosphorus, etc. Also and particularly when fatty acids or fatty glycerides are present in the complex, sulphur and oxygen are illustrative of substances not truly acid, but which do react to materially modify the characteristics of such complexes.

Various examples of complexes produced in accordance with this disclosure containing inorganic acids or compounds containing reactive inorganic acid radicals are set forth below as illustrative of the features more generally discussed immediately above.

The following example illustrates a condensation product utilizing an inorganic acid, illustrated by boric acid for reaction with another organic carboxylic acid, particularly a dibasic acid and a polyhydric alcohol, specifically illustrated by glycerol. Boric acid, tartaric acid and glycerol were heated together in the proportion of 31 parts boric acid, 75 parts tartaric acid, and 46 parts glycerol, parts being by weight, giving at 140° C., a transparent amber-colored mass soluble in hot water; at 160° C. an opaque, brittle product also soluble in hot water, is obtained. Similarly boric acid, phthalic acid and glycerol yield solid glossy products.

Phosphoric acid may be utilized to modify the reaction product of phthalic anhydride and glycerol or equivalent substances. For example, reaction of phthalic anhydride and glycerol in equimolecular proportions in the presence of 10% by weight of phosphoric acid accelerates the reaction of resinification, the reaction starting at 142° C. and the solidification point being reached at 210° C., which temperatures are materially lower than the corresponding point for the phthalic-glycerol combinations produced in the absence of phosphoric acid. Similarly the glycerides of maleic and fumaric acids formed in the presence of phosphoric acid polymerize at lower temperatures than those obtained in the absence of phosphoric acid.

Sulphuric acid when present in considerable proportions, such as 10%, causes a rather too violent a reaction between the phthalic anhydride and glycerol or related materials, so that a lesser proportion of this type of mineral acid should be employed. Or in lieu thereof the acid salts may be utilized, such as ammonium bisulphate or sodium bisulphate. In general, it may be stated that the acid salts of the various inorganic acids may be employed in lieu of the acids themselves. Illustrating the use of the acid salts of sulphuric acid, molecular equivalents of phthalic anhydride and glycerol, together with 10% by weight of sodium bisulphate (calculated on the total weight of the other ingredients) was distinctly active. Reaction started at 135° C., and spontaneous solidification took place between 160 and 165° C. with the formation of light brown hard complex, infusible on heating. It is insoluble in water, and rather difficultly soluble in organic solvents, such as alcohol-benzol mixtures.

Silico-tungstic acid used in the proportion of 10% acts somewhat too vigorously. Reaction starts at 115° C. and at 120-125° C. the mix becomes very viscous. The jelly-like mass which forms under the influence of this acid darkens rapidly, and an odor resembling burning sugar can be detected at the outlet of the air-condenser (reflux condenser) attached to the heating receptacle. The temperature increases without application of external heat, reaching 160° C. at which point the batch becomes liquid again. On cooling, a very dark hard fusible resin was obtained, substantially altered physically and chemically by this acid.

Illustrating a different manner of employing the silico-tungstic acid, a mixture of phthalic anhydride and glycerol was first brought to the melting point (135-140° C.) and silico-tungstic acid was introduced gradually. With less than 1% the temperature could be raised to 200° C. without solidification. The temperature was reduced to 140° C. and silico-tungstic acid sufficient to make 2 per cent was added. The marked influence of this proportion was readily noticeable, although solidification did not occur, a fusible product being obtained. When 4% of silico-tungstic acid was introduced at 140° C. frothing began immediately, followed by spontaneous rise in temperature. Solidification took place at 155° C. as a result of such spontaneous heating and a hard slightly-dark infusible resin resulted.

Phospho-tungstic acid has a much milder action. Thorium nitrate and uranium nitrate likewise are mild in their action. With the latter, reaction starts at about 130° C. (evolution of water) and an increase in the viscosity of the melt up to 200° C. There were no frothing or solidification phenomena. On cooling the product was a transparent yellow resin, somewhat sticky, fusible and slightly affected by water.

These example are fairly illustrative of various reaction products obtained by the use of such common inorganic acids as phosphoric acid, boric acid, chromic, sulphuric acid, and their acid salts, particularly such as the sodium or ammonium acid salts, including sodium and ammonium bisulphates, as well as the rarer acids, such as silico-tungstic acid, and phospho-tungstic acid, etc. A wide range of acid bodies of the inorganic domain may thus be employed.

Considering such substances as may conveniently be classified along with the inorganic acids, although they are not truly inorganic acids, these may be exemplified by the various chlorides and oxychlorides of phosphorus. Phosphorus pentachloride, for example, acts differently from phosphoric acid. Phthalic acid and glycerol in molecular proportion were mixed with 10 to 15% of phosphorus pentachloride with constant stirring. On heating under a reflux condenser without agitation, the mixture darkened rapidly at a temperature near the melting point of phthalic anhydride and started to froth. The frothing continued for some time without any external heat being applied. On cooling, a dark resinous mass was obtained which was hard and brittle. When a similar reaction mixture was heated with agitation, it was observed that the mix became liquid and transparent below the melting point of phthalic anhydride. The first traces of water were given off at 155° C., and at this point the liquid darkened slightly. The separation of water continued until the temperature reached 170° C. and then stopped. At 210° C. thickening occurred and water was given off a second time. Rapid solidification to a spongy solid took place at 215° C. followed by a spontaneous rise in temperature at 230° C. The resulting product is a porous, hard, infusible solid, slightly dark in color.

Phosphorus trichloride and oxychloride may be used in like manner.

The inorganic acids, acid salts, and compounds containing reactive inorganic acid radicals, may be employed in a similar manner in the production of these condensation complexes, in which glyceride oils, or the fatty acids from glyceride oils, or the individual higher fatty acids, per se, such as oleic, linoleic, stearic, and the various individual acids that are found in the siccative oils may be employed. As exemplary of such combinations, the following are given.

The following example illustrates the use of ammonium bisulphate, in the reaction between a polybasic acid, a polyhydric alcohol, and the fatty acids of a glyceride oil. 54 parts by weight of phthalic anhydride, 20 parts glycerol, and 1 part ammonium bisulphate were heated in a receptacle without mechanical agitation. At 150-160° C. considerable darkening occurred. 15 parts of linseed oil fatty acids were added, and the temperature was gradually increased to 220° C. to obtain a homogeneous product, dark brown in color, and soluble in a mixture of benzol and alcohol, equal parts. During the above heating operation, the order of acrolein was observed, showing that decomposition and modification was taking place.

When using the same proportions and procedure as that employed above for the ammonium bisulphate reaction, but substituting sodium bisulphate for the ammonium bisulphate, a resin of almost identical appearance, but with slightly lighter color resulted. The resin was quite hard and exhibited substantial toughness.

Employing like proportions in the same manner, but using a mixture of equal parts of ammonium bisulphate and zinc chloride, using 1 part of this mixture to 54 parts phthalic anhydride, 20 parts glycerol, and 15 parts linseed oil fatty acids, a resin was obtained of a generally similar character but slightly lighter in color than that produced by the ammonium bisulphate or the sodium bisulphate used singly.

Similarly the ammonium bisulphate may be utilized in the production of the oleic acid types of combinations. 40 parts phthalic anhydride, 16 parts glycerol, 20 parts oleic acid and 1 part ammonium bisulphate were heated to about 170° C. at which point a fairly vigorous reaction set in. Then the temperature was carried to 240° C. over a period of one-half hour to cause further reaction and polymerization. Vapors of acrolein were noted. The final product was a dark brown, soft material, transparent and very adhesive. It was found to be soluble in benzol and toluol and blended with nitrocellulose in a solvent mixture composed of equal parts of butyl acetate and toluol.

Stearic acid and other higher fatty acids may be utilized in lieu of the oleic acid. Substituting stearic acid in the same proportion for the oleic acid set forth in the above example, and utilizing an identical procedure, a dark brown product, slightly harder than the oleic resin, was secured. It was partially opaque, but gave a transparent film when incorporated in a solution of nitrocellulose.

The following example illustrates the use of metaphosphoric acid replacing a portion of the phthalic anhydride in the production of a linseed oil fatty acids resin. 40 parts by weight of linseed oil fatty acids, 41 parts phthalic anhydride, 5 parts metaphosphoric acid, and 23 parts glycerol were employed. The phosphoric was first dissolved in the glycerol, and then added to the mixture of acids. The entire mixture was heated with mechanical agitation under an air condenser up to 290° C. in 30 minutes. The resulting product was a dark resin, slightly lighter than a corresponding resin produced omitting the phosphoric acid. The phosphoric acid had a material effect on the characteristics of the resin as shown by the fact that the phosphoric acid resin was more glossy, had a higher melting point, and was less tacky than the corresponding resin produced without phosphoric acid. It had an acid number of 33.5, and was soluble in a benzol-alcohol mixture, and also in butyl acetate. The solution in butyl acetate was slightly turbid, but could be cleared by addition of benzol or toluene. The resin blends with nitrocellulose.

In the example given above, it will be noted that the phosphoric acid was first dissolved in the glycerol. A similar step may be employed to produce partial reaction at least between the phosphoric and the glycerol before these materials are reacted with the other acids. For this purpose the phosphoric acid and glycerol may be heated prior to the incorporation of the other acids, and then the remainder of the example followed through. Such a process illustrates the preparation of esters of the inorganic acids and their reaction into the complexes.

Reference to the initial production of the glycero-phosphates, particularly when they contain a remaining unreacted acid group in the phosphoric acid residue, illustrate as noted, the production of these inorganic acid reaction complexes where the acid component is utilized in ester form. Another example that serves to illustrate the use of the esters of the inorganic acids, and in this instance of a monobasic inorganic acid is concerned with the use of chlorhydrins of the polyhydric alcohols. A sample of polyglycerols, together with chlorhydrins, was prepared by boiling glycerin with one-half of its bulk of water in 10% of hydrochloric acid at 120° C. for six hours. This mixture with 2 parts of phthalic anhydride was submitted to esterification. Thickening of the mass and first separation of water started at 140° C., and the reaction behaved in general similar to that of the glycerolphthalic combinations, except that the temperatures at which reaction took place in the several stages was lower: the first period showing reaction with the polyglycerol-chlorhydrins combination at from 135 to 140° C. whereas glycerol gives the first period of reaction at about 185° C.; the second period of reaction with the polyglycerol-chlorhydrins combination was at 155–160° C., whereas the glycerol alone, the second period of reaction is at 210° C.; and the final solidification with the polyglycerol-chlorhydrins combination took place between 200–205° C., whereas with glycerol, the solidification takes place at 235–240° C.

Similarly, the other inorganic acids or compounds having reactive inorganic acid radicals may be converted into esters either with alcohols of the aliphatic or aromatic series, phenols, etc., and utilized in the production of these complexes. The term "inorganic acid ester" is used herein to cover esters of an alcohol or phenol with an inorganic acid.

Along similar lines one may look upon the use of sulphonic acids, nitro compounds, etc., as illustrative of compounds containing reactive inorganic acid radicals. Or on the other hand, they may be looked upon as esters of the corresponding inorganic acid with an alcohol or phenol as the case may be.

As illustrative of the production of these complexes by the utilization of compounds containing reactive inorganic acid groups, the nitro and sulphonic acids have been referred to. The following illustrates the production of a condensation product by the use of benzoic acid in admixture with nitro-benzoic acid and a polyhydric alcohol. 100 parts by weight of benzoic acid containing from 10 to 15% of nitro-benzoic acid, and 26 parts by weight of glycerol were heated under an air condenser while agitating. The mixture was gradually heated for 2½ hours, bringing the temperature slowly up to 290° C. On cooling the product obtained was a viscous very dark mass, soluble in organic solvents, and by itself a solvent for nitrocellulose. As compared with the ester of benzoic acid per se, the product obtained in this example was heavier in consistency, but still rather soft.

A further example illustrating the use of paranitrobenzoic acid in a three-component complex is given. 25 parts of paranitrobenzoic acid, 22 parts phthalic anhydride and 14 parts glycerin were heated for one hour, the temperature in that time rising to 280° C. A rather dark, hard and somewhat brittle resin was obtained. It was readily soluble in butyl acetate, but did not mix well with nitrocellulose in this solvent. This particular product is not as compatible with nitrocellulose as straight benzoic phthalic glyceride resin, and is also somewhat darker in color than the latter.

Similarly, 25 parts by weight of paranitrobenzoic acid were combined with 5 parts by weight of glycerol to form a soft condensation product utilizable as a nitrocellulose softener, but upon further heating for about seven hours was converted into a hard, brittle, dark resin soluble in hot butyl acetate.

As exemplary of the use of sulphonic acids or sulpho acids, the following example employing Twitchell reagent is given. 94 parts by weight of glycerin, 160 parts phthalic anhydride, 80 parts corn oil and 4 parts Twitchell reagent were mixed and heated with constant agitation. The temperature was gradually raised. If allowed to reach 240° C. in 30 minutes, the product polymerizes.

Varying this reaction, the same materials were reacted in the following manner. The corn oil was heated to 120–130° C. for one hour with Twitchell reagent. The glycerin and phthalic anhydride were added, and the temperature brought up to 240° C. in 30 minutes. At this point the mixture showed signs of thickening. 25 grams fatty acids from castor oil were added, and the temperature allowed to drop to 210° C. and heat again applied. By heating to 245° C. the mass polymerized.

The examples given above are illustrative of the various types of combinations into which the inorganic acids or compounds containing inorganic acid radical groups may be combined. But the various types of organic acids and polyhydric alcohols that may be employed in producing the complexes into which the inorganic acids are reacted is exceptionally broad. The organic acids that may be included for this purpose comprise the aliphatic and aromatic, monobasic, dibasic and polybasic acids, both saturated and unsaturated, including oxy or hydroxy acids, aldehyde acids, ketone acids, and other acids containing substituent radicals, particularly composed of two or more combinations of the elements carbon, hydrogen and oxygen. Other acids containing substituent groups of which some examples have been given above include nitro, sulpho, chloro, bromo acids and the like. Reactive terpene acids may also be utilized. The cyclic acids of the aliphatic series are those containing both the aromatic nucleus and a cyclic aliphatic group may be employed. Naphthionic acid may be utilized.

Usually with such acids, there may desirably be employed fatty acids, particularly those derived from the natural animal and vegetable fats and oils, and particularly because such fatty acids confer distinctive properties on the complex, including a notable degree of water stability. The glycerides may be utilized as set forth above, but they are less reactive and assimilable than the free fatty acids, and usually require some special procedure, such as pressure, the presence of glycols, the presence of acid gums, such as rosin, etc., in order to secure a well defined and reacted product. The general class of organic acids that may be employed include not only the mixtures of fatty acids referred to immediately above, but the individual acids, both saturated and unsaturated occurring in the fatty acid complexes obtained on saponification of the vegetable fats and oils.

Considering in detail some of the organic acids that may be employed, there may be mentioned succinic, malic, citric, malo-malic, mucic, maleic, fumaric, tartaric, pyro-tartaric, glutaric, lactic, acrylic, adipic, hydracrylic, glycolic, azelaic, diglycolic, glyoxylic, suberic, hydroxy-butyric acetoacetic, pyro-racemic, pyruvic, benzoic, chlorbenzoic, nitrobenzoic, benzoyl-benzoic, toluyl-benzoic, cinnamic, salicylic, diphenic, naphthoic, naphthalic, toluic, hydro-cinnamic amino-benzoic or anthranilic, camphoric and the like. Liquid acids of the lower aliphatic acid series, such as propionic and chloracetic, generally are used only in a very restricted way, owing to the resulting physical properties, lack of water-stability, and so forth.

Benzoic, phthalic and salicylic acids are good examples of heat-stable reactive acids of the non-carbonizing type, yielding complexes of light color. Phthalic acid being cheaply prepared as the anhydride is highly appropriate.

Among the fatty acids from the various animal and vegetable oils there may be mentioned the fatty acids of lard, tallow, neatsfoot, seal, whale, menhaden, cod, cocoanut, palm kernel, peanut, olive, cottonseed, corn, soya, palm, rape, sesame, linseed, tung, perilla and sunflower oils and their oxidized, blown or hydrogenated, chlorinated or otherwise substituted derivatives. These oils include such acids as lauric, myristic, palmitic, stearic, oleic, erucic, behenic, linoleic, linolenic and clupanodonic acids.

Other and possibly more anomalous raw materials are the free acids of cocoa butter, Japan wax and castor oil.

Mixtures of the different oils with or without inclusion of their free fatty acids, and mixtures of the free fatty acids of different oils may be employed, especially those having differing chemical characteristics, such as cottonseed acids and cocoanut acids. Both siccative and non-siccative oils and their fatty acids may be employed in producing these complexes. In general when the fatty acids are employed in producing these complexes, there is desirably employed another organic carboxylic acid, such as phthalic acid or its equivalent, as illustrated in several of the examples given above.

These various complexes may also be produced with or modified by means of the natural resins, such as rosin, oxidized rosin, dammar, sandarac, mastic, elemi, the resin esters, such as ester gum, etc.

Complexes produced by means of the natural acid resins, illustrated by rosin, for example, have many desirable properties and many purposes. The natural resins, such as rosin, may be reacted with a polyhydric alcohol and another organic carboxylic acid of the non-resin type, such as phthalic anhydride, for example. Desirably monobasic acids may be employed in producing the complexes with the natural acid resins, such as rosin, and the polyhydric alcohols. The following examples illustrating the use of benzoic and salicylic acids partly replacing phthalic acid in producing monobasic acid combinations of the natural resins are given.

Rosin, benzoic acid, glycerol and phthalic anhydride were used in approximately equimolecular proportions, except the phthalic anhydride which was employed in one-half molecular proportion. For this purpose 302 parts by weight of waterwhite rosin, 122 parts benzoic acid, phthalic anhydride 74 parts, and 94 parts glycerol were heated while agitated, the temperature being carried to 290° C. in one hour. A product of acid number 37.5, somewhat soft and sticky, and soluble in benzol or alcohol and benzol mixtures was obtained.

A rosin salicylic phthalic glyceride may be prepared by heating water-white rosin, 60.4 parts by weight, salicylic acid 37.6 parts, phthalic anhydride 14.8 parts and 98% glycerol 18.8 parts. The materials were heated together, and the temperature carried to 290° C. in 40 minutes. A hard but somewhat tacky resin was obtained, rather lighter in color than rosin phthalic glyceride. Heating under vacuum tended to harden the product. The rosin salicylic phthalic glyceride resin produced clear 50% solutions in benzol, toluol and xylol.

A rosin benzoic glyceride may be prepared from water white rosin 300 parts by weight, benzoic acid 89.1 parts, and glycerine (98%) 58.9 parts, these ingredients being mixed, melted together in a suitable vessel and heated over a period of 1½ hours to 290° C. using mechanical agitation throughout. (The proportions of ingredients suggest the equivalent of 3 parts of rosin ester to 1 part of glyceryl tribenzoate). A light brown, soft, sticky, transparent resin results of acid number 41.9. The resin is completely soluble in benzol, acetone, butyl acetate, and in a mixture of equal parts of benzol and alcohol, but is not soluble in straight denatured alcohol. It blends well with soluble cotton in butyl acetate-benzol mixture and exerts a softening action therein so that it may be used as a relatively inexpensive softening agent.

Similarly, instead of using monobasic aromatic acids, monobasic aliphatic acids may be employed, particularly the fatty acids of high molecular weights, including both the saturated acids, such as stearic, and the unsaturated acids, such as oleic, linoleic, etc. Thus products from rosin, stearic or oleic acids, and glycerol or other polyhydric alcohol may be produced, both with and without the presence of inorganic acids, such as boric acid, sulphuric acid, and the other acids and acid salts mentioned above.

For example a stearic rosin phthalic glyceride may be prepared as follows: Stearic acid 38 parts by weight, water white rosin 33.8 parts, phthalic anhydride 67.5 parts, and glycerol 35.7 parts were heated together in a suitable vessel to 290° C. and held at that temperature for ½ hour. The product was a clear transparent amber colored resin of slightly tacky nature having an acid number of 40.2. It was freely soluble in lacquer solvents and compatible with nitrocellulose. Longer heating than that given above may be used to harden the resin.

A further example of a modified resin from a higher fatty acid and a natural resin is the following. The parts are by weight. Pentaerythritol 58 parts, stearic acid 45 parts, fused congo resin 45 parts and phthalic anhydride 74 parts. The mixture was heated together to 290° C. and held at that temperature for ½ hour. A hard, somewhat brittle, amber colored resin resulted, of acid number 38.6. It was soluble in the usual lacquer solvents and was compatible with nitrocellulose.

A more complex higher fatty acid natural resin condensation product may be made as follows. The parts are by weight. A mixture was made of:

| | Parts |
|---|---|
| Stearic acid | 14 |
| Cocoanut fatty acid | 14 |
| Rosin | 15 |
| Fused Congo | 15 |
| Phthalic anhydride | 14.8 |
| Succinic acid | 11.8 |
| Glycerol | 3.1 |
| Pentaerythritol | 13.8 |
| Diethylene glycol | 5.4 |
| | 102.9 |

This mixture was heated under an air cooled reflux condenser to 290° C. in one hour and held at 280–290° C. for one hour. A portion of the batch was poured on a flat surface and quickly cooled whereby a product of light amber color was obtained of plastic nature and blending well with nitrocellulose. The main portion of the batch was poured into a can to cool and formed an infusible polymer.

In the immediately preceding three examples, the amount of resin acid may be increased and with such increase of resin acid, the amount of polybasic acid may be decreased or eliminated entirely.

The following example illustrates a resin produced from a monobasic acid and higher fatty acids. The parts are by weight. Glycerol, 94, phthalic anhydride 60, benzoic acid 50, and corn oil fatty acids 100. The mixture was heated under an air condenser with agitation over a period of 1¼ hours to a temperature of 295° C. The product was a dark, honey like syrup of acid number 9.7, easily soluble in organic solvents such as alcohol, alcohol benzol mixtures, butyl acetate, and butyl acetate-butanol mixtures. It was blended with nitrocellulose to form a clear solution yielding a clear film. It showed a gelatinizing action with ½ second cotton.

A higher fatty acid condensation product produced in the presence of an inorganic reaction modifier is the following. Toluyl benzoic acid (commercial) containing an appreciable quantity of aluminum chloride was used. The parts are by weight. Stearic acid 71, toluyl benzoic acid 120, and glycerol 23¼. These substances were heated together under an air cooled reflux condenser. Much foaming occurred and at 240° C. large amounts of acrolein were emitted. The final product after ½ hour heating was a brownish-amber colored, sticky balsam.

While in many of the examples given above, the polyhydric alcohol has been illustrated by glycerol, the various other polyhydric alcohols and their substituted products may be employed, such as glycerol in its various forms, dilute, concentrated, crude or refined; polyglycerols, which include a variety of products such as diglycine having but two free hydroxyl groups, and therefore being more in the nature of a glycol, and other polyglycerols containing 4 and 5 hydroxyl groups; the various glycols, such as ethylene and propylene glycols; the ethers of the various polyhydric alcohols, such as the mono or di, methyl, ethyl, propyl ethers of glycerol, the monoethyl ether of ethylene glycol, etc.; the glycol ethers so-called, being polyglycols obtained by condensation of two or more molecules of a given glycol into the inter-ether, such as dihydroxy diethyl ether, dihydroxy triethyl diether; the chlorhydrins or other halohydrins; ethylene oxide and its homologues, such as butylene oxide, mannitol, pentaerythritol, etc.

The examples given above have been primarily concerned with the introduction of the inorganic acid or compound containing a reactive inorganic acid group into the resin during the preparation of the resin in its initial stages. The production of the resins and the carrying out of the reactions set forth above, may take place under pressures greater than atmospheric, particularly when the reaction products including the siccative oil or other vegetable and animal oils are to be obtained, or ordinary atmospheric pressure or vacuum may be employed when desired.

The resins and other products contemplated by this invention may be produced in atmospheres other than oxygen or air. In fact, to prevent darkening, the use of inert atmospheres is frequently desirable, which may be obtained by bubbling nitrogen or other inert gas through the reaction mixture. Instead of using nitrogen and inert gases, the acid anhydrides, such as sulphur dioxide and carbon dioxide may be employed. But such acid gases, particularly sulphur dioxide may have some effect in orienting the character of reaction products obtained.

As exemplary of the treatment of the resins after their initial production by compounds of the inorganic acid type, or analogous thereto, the following examples may be given.

For example, a cottonseed phthalic glyceride resin was treated (A) with 1% phosphorus trichloride, and (B) with 1% phosphorus oxychloride, the resin in each case being dissolved in a mixture of equal parts of benzol and ethyl acetate. The resin used initially was slightly tacky, but after the treatment by either phosphorus trichloride or phosphorus oxychloride, the tackiness disappeared. The viscosity in solution was greater with product A than with product B.

As further illustrating the modification of these complexes, particularly when the fatty acids from vegetable glycerides have been reacted into the condensation products, we may illustrate the treatment of such products by either oxygen or sulphur, the following examples being concerned with the use of sulphur.

34 parts by weight of castor fatty acid phthalic glyceride resin were melted to 150° C. in an aluminum cup, and 3.4 parts of sulphur added. The sulphur dissolved, but showed no appreciable reaction at this temperature, so the temperature was increased to 180° C. and reaction progressed rapidly at 180–190° C. The resin grew progressively darker in color, and thickened to a rubbery brown mass. Upon cooling, an opaque and brittle mass was obtained. It became quite rubbery on heating however. The product was insoluble in acetone, benzol, butyl acetate, toluol, etc.

50 parts by weight of castor fatty oil phthalic glyceride resin containing a sufficient amount of castor oil to be quite soft and tacky was melted to 120° C. and 5 parts by weight of sulphur added. The temperature was carried to 180° C. and the reaction mixture became dark reddish brown in color and was transparent. The temperature was taken to 200° C. in 5 minutes, and a small portion examined. On cooling a slightly tacky and rubbery material was obtained, which was soluble in toluol (the original material being insoluble in toluol). It was also soluble in butyl acetate. 1 part more of the sulphur was added, and the mixture heated a little longer. This caused the mix to thicken more, and it was then only partially soluble in toluol and in butyl acetate. The product obtained from this reaction, in view of its rubbery nature and solubility, is suitable for artificial leather, with introcellulose, for the production of rubber substitutes, etc.

A considerably different method of producing reaction of the inorganic acids is illustrated by the following. 700 parts by weight of rosin phthalic glyceride resin were dissolved in 50 parts by weight benzol and 50 parts denatured alcohol. $\frac{1}{10}$ part by weight of syrupy phosphoric acid was added. The resin lightened in color considerably. The effect of syrupy ortho-phosphoric acid in this connection is analogous to that of oxalic, which exerts a similar effect.

Having thus set forth my invention, I claim:

1. An inorganic acid-modified natural resin polyhydric alcohol higher fatty acid reaction product.

2. An inorganic acid-modified natural resin glyceride oil-polyhydric alcohol-organic carboxylic acid reaction product.

3. A boric acid-modified natural resin glyceride oil-polyhydric alcohol-organic carboxylic acid reaction product.

4. A boric acid-polyhydric alcohol ester, organic carboxylic acid reaction product.

5. A soluble resinous condensation product consisting of the combined radicals of glycerol, phthalic anhydride and boric acid.

6. The process for making a resinous condensation product which comprises reacting a polyhydric alcohol, a polybasic organic carboxylic acid, an acid of the fatty series containing several unsaturated linkages in the molecule, and a boric acid compound.

7. The process for making a resinous condensation product which comprises reacting glycerol, phthalic anhydride and boric acid.

8. A resinous condensation product containing the reaction products of glycerol, phthalic acid, a fatty acid with several unsaturated linkages in the molecule, and boric acid.

9. A resinous condensation product containing the reaction products of glycerol, phthalic acid, linoleic acid, and boric acid.

10. A resinous condensation product containing the reaction products of glycerol, phthalic acid, eleomargaric acid and boric acid.

11. A resinous condensation product containing the reaction products of glycerol, phthalic anhydride, and boric acid.

12. A soluble resinous condensation product, capable of drying on exposure to air, and containing the radicals of glycerol, phthalic acid, linoleic acid and boric acid.

13. The method of producing complex resinous condensation products, which comprises heating glycerol, phthalic acid, boric acid, and a fatty acid until a resinous condensation product is obtained.

14. The method of producing complex resinous condensation products, which comprises heating glycerol, phthalic acid, boric acid, and linoleic acid until a condensation product is obtained.

15. The method of producing complex resinous condensation products, which comprises heating glycerol, phthalic acid, boric acid, and linoleic acid in the presence of rosin until a resinous condensation product is obtained.

CARLETON ELLIS.